March 24, 1959    A. C. LUTHER, JR., ET AL    2,879,441

PHASE GENERATING SYSTEMS

Filed June 4, 1954

INVENTORS
ARCH C. LUTHER, JR.
ROY J. MARIAN
BY [signature]
ATTORNEY

United States Patent Office 2,879,441

Patented Mar. 24, 1959

2,879,441

PHASE GENERATING SYSTEMS

Arch C. Luther, Jr., Merchantville, and Roy J. Marian, Mount Ephraim, N.J., assignors to Radio Corporation of America, a corporation of Delaware Application June 4, 1954, Serial No. 434,412

14 Claims. (Cl. 315—10)

This invention relates to pulse generators and more particularly to stable systems for generating various type time delayed pulses for use in a television pickup system.

The function of a television image pickup system is to convert a light image or picture into an electric video signal which may be utilized to reproduce the picture or light image. There are a variety of different types of television image pickup devices or pickup tube systems, however, one operating characteristic generally common to all such systems is the use of an image area or target electrode within the pickup tube on which an electric charge pattern is set up by various methods. Methods of setting up the charge pattern on the target electrode include the utilization of photo emissive and photo conductive material. The charge pattern set up on the signal plate is representative of a light image or picture which may be projected either directly or indirectly upon the target electrode. A cathode ray beam is then provided and is moved horizontally and vertically in such a manner as to form a raster thereby scanning the image area of the target electrode. During the scanning operation the cathode ray beam deposits sufficient electrons on the target electrode to neutralize the charge on the electrode, and while so doing generates a video signal which varies as the number of electrons deposited to neutralize the charge pattern.

The scanning operation is effected by two sets of electric signals, horizontal deflection signals which tend to move the cathode ray beam along a horizontal path and vertical deflection signals which tend to move the cathode ray beam along a vertical path. The combined effect of the two deflection signals is to cause the cathode ray beam to scan the raster. The horizontal and vertical deflection signals are generated in deflection signal generators which are synchronized by vertical and horizontal synchronizing pulses.

In the customary operation of an image pickup tube the image charge pattern which is formed upon the target electrode covers a greater area than the area to be scanned by the cathode ray beam. The purpose of using the enlarged charge pattern area is to minimize the electrical and mechanical scanning tolerance requirements. The fact that there is an area on the target electrode which is electrically charged but which is not scanned causes this charged but unscanned area to accumulate an undesirable electric charge, the target electrode therefore has a charge pattern which covers a greater area than the area to be scanned.

The electric charge accumulated upon the charged but unscanned area creates leakage currents which penetrate into areas which are normally scanned by the cathode ray beam and are used to form the video signal. The result of the leakage currents is to create a bright line effect in a portion of the reproduced image which was adjacent to the charged but unscanned areas. This bright white line effect or image area leakage current picture interference is created due to the fact that the areas receiving leakage currents receive a positive charge from the leakage currents and therefore the charge level of these areas does not represent the light image or picture to be televised, but instead depends on the leakage currents. Consider a signal area adjacent to the charged but unused areas during the operation of a pickup tube. This signal area is neutralized in potential upon being scanned by the cathode ray beam, however, leakage currents to the signal area place a charge on the signal area which causes the image representing charge on the signal area to be confused and lost, and thereby creates white line interference. Apparatus for combatting this type interference is shown and described in U.S. Patent application, Serial No. 428,088, filed May 6, 1954, by Keith E. Mullenger and Fred L. Hatke, now abandoned. In the above referenced U.S. patent application, apparatus is provided for scanning the charged but unused signal areas with the cathode ray beam thereby lowering the voltage potential on such areas to a degree whereby leakage currents are not formed in the charged pattern which is utilized to form the video signal. The method of creating such a scanning pattern described in the above referenced U.S. patent application is to delay the synchronizing pulse which causes the deflection signal generator to return the scanning cathode ray beam to its point of beginning. The delay incurred thus allows the cathode ray beam to move into the charged but unused areas on the target electrode and lower the potential of such areas thereby preventing leakage currents.

A circuit often used in the forming of various type pulses is the so-called multivibrator. The basic monostable multivibrator circuit comprises a pair of intercoupled electron discharge tubes so arranged as to generate a substantially square wave output having a predetermind duration. The generation of the square wave is initiated by the application to the multivibrator circuit of a triggering pulse. The duration of the output square wave is determined by a timing circuit which usually consists of a timing capacitor and a timing resistor in the circuit coupling the plate of the first multivibrator vacuum tube to the grid of the second multivibrator vacuum tube. A method of increasing the stability of pulse duration of multivibrator circuits is shown and described in one of the applicants, Arch C. Luther, Jr., copending U.S. patent applications, Serial No. 377,925, filed September 1, 1953, and Serial No. 343,623, filed March 20, 1953. The method utilized in the above referenced copending applications to stabilize a multivibrator device is by the use of a cathode resistor in the cathode circuit of one of the multivibrator tubes and by a method of cross coupling the multivibrator tubes. The cathode of the vacuum tube so stabilized, by the addition of cathode resistance, is then prevented from going to a negative potential and thereby making it difficult to maintain the tube cutoff, by using a capacitor which couples the cathode to ground potential in the first case, and by using a unilateral conducting device which couples the cathode to a source unvarying potential in the second case.

It is desirable in pulse generating circuits to have stability which is unvarying with the replacement of vacuum tubes, or with the changes in constants accompanying the deterioration and aging of vacuum tubes. The stability gained by using a cathode resistor results from the fact that the degree of change in the interelectrode voltage between the cathode and grid of a vacuum tube which normally occurs with use and aging of a vacuum tube becomes small in relation to the other voltages within the multivibrator circuit due to the cathode resistor action. When the interelectrode voltage variation between the grid and the cathode of a vacuum tube in a multivibrator is proportionally small the pulse duration of the multivibrator circuit becomes more stable.

The present invention in its more general form contemplates the use of a delay pulse generating circuit to overcome white line interference effects. The pulse generating circuit used is of the type wherein two electron discharge devices have their control elements interconnected such that the conduction of each of the electron discharge devices is controlled by whether or not the other electron discharge device is in a state of conduction or in a state of non-conduction. The operation of the pulse generating circuit to generate a pulse is then delayed by the use of a charging circuit which prevents the forming of a pulse until a predetermined charge appears on the charging circuit. The charging and discharging of the charging circuit is controlled by the conduction and non-conduction of the electron discharge devices. The operating characteristics of the devices are stabilized by the use of a cathode resistor in the cathode circuit of one of the electron discharge devices.

It is therefore an object of this invention to provide an improved television pickup system.

Another object of the invention is to provide a more economical television pickup system.

A further object of this invention is to provide an improved pulse generating system for a television pickup system.

A still further object of this invention is to provide a pulse generating system having improved stability and predetermined delay for use in a television pickup system.

Other and incidental objects of this invention will be apparent to those skilled in the art from reading the following specification and on inspection of the accompanying drawing in which.

Figures 1, 2:
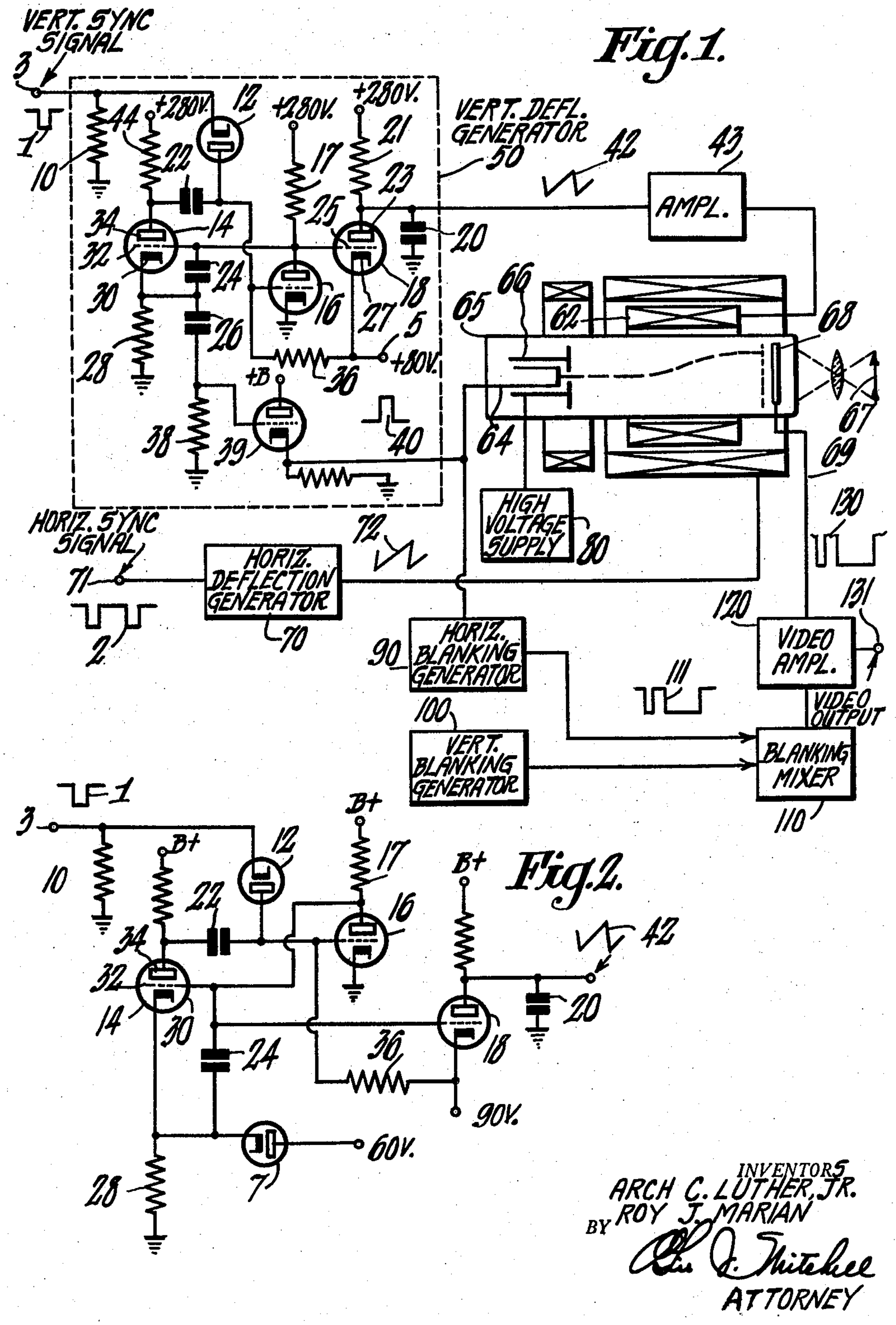
Figure 1 shows a schematic and block diagram which represents a form of the invention.
Figure 2 shows a schematic diagram which represents a second form of the invention.

Referring now to Figure 1 there is shown a vertical synchronizing signal input terminal 3 adapted to receive a vertical synchronizing pulse 1. The pulse 1, appearing across an input resistor 10, is applied through a diode 12, to a grid of a first vacum tube 16. The first vacuum tube 16 has a plate which is directly connected to a control grid 32 of a second vacuum tube 14. A plate 34 of the second vacuum tube 14 is connected through a capacitor 22 to the control grid of the first vacuum tube 16. A resistor 36 is conected from a source of potential 5 to the capacitor 22, such that the capacitor 22 and the resistor 36 form a resistance-capacitance time delay or timing circuit. Vacuum tube 14 has a resistor 44 in its plate circuit which is in turn connected to a source of voltage potential, and a cathode resistor 28 in its cathode circuit which is in turn connected to a point of reference potential. A charging condenser 24 is connected between the control grid 32 and the cathode 30. A condenser 26 is serially connected with a resistance 38 between the cathode 30 and the point of reference potential. The midpoint between condenser 26 and resistance 38 is connected to a beam cathode 64 of a television image pickup tube 65 through a cathode follower tube 39, such that a pulse 40 may be transferred to the beam cathode 64 through an isolation stage of amplification. A plate of vacuum tube 16 is connected to a control grid of a third vacuum tube 18 and to a resistor 17 which is connected to a source of potential. The third vacuum tube 18 is connected to be energized by a source of potential applied to a plate 23 through a plate resistor 21, and a source of lower potential applied to a cathode 27. The plate resistor 21 is connected to an output capacitor 20, the output capacitor 20 being so connected as to integrate signals appearing at the grid 25 of the third vacuum tube 18, thereby forming a sawtooth deflection pulse 42. The deflection pulse 42 is coupled by an amplifier 43 from the previous described circuitry, which forms a vertical deflection generator 50, to a deflecting means 62 of the image pickup tube 65. The image pickup tube 65 is adapted to have an image 67 projected upon it which will set up a charge pattern on a signal plate 68. The scanning of the signal plate 68 by an electron beam emitted from the beam cathode 64 and formed by a gun 66 will generate a video signal at video signal terminal 69. A detailed description of the operation of a tube similar to image pickup tube 67 may be found in RCA Review, September 1951, page 306. A source of high voltage 80 is connected to the image pickup tube gun 66, and the tube walls of image pickup tube 65. The video signal terminal 69 is connected to a video amplifier 120 wherein a composite blanking signal 111 is mixed with the video signal to form the output video signal 130, which appears at the video output terminal 131 and which may be utilized to reproduce the picture. The blanking pulses 111 are formed by combining pulses from a horizontal blanking generator 90 and a vertical blanking generator 100 in a blanking mixer 110. A horizontal blanking generator 90 is connected to the beam cathode 64 of image pickup tube 65. A horizontal synchronizing signal input terminal 71 is provided to receive horizontal synchronizing pulses 2, and transfer the synchronizing pulses 2 to a horizontal deflection generator 70. The deflection pulse 72 from the horizontal deflection generator 70 is connected to the horizontal deflecting means shown surrounding the vertical deflecting means 62 of the image pickup tube 65.

In the operation of the circuit of Figure 1, consider that the circuit has been in operation for such a period of time as to reach a steady state operating condition but, at an instant when no vertical synchronizing signals are being applied to the generator 50. At this instant vacuum tube 16 will be conducting to such a degree that the plate is at a sufficiently low voltage to maintain the vacuum tube 14 cutoff by means of the control grid 32. The condenser 26 is in a charged state having been charged, positive at the cathode 30 side, by previous conduction periods of the vacuum tube 14. As the resistance of the resistor 28 is much larger than the resistance of the resistor 38, nearly all the potential on condenser 26 will appear between the cathode 30 and the reference point, which is shown as ground. Upon the arrival of a vertical synchronizing pulse 1 to the vertical synchronizing terminal 3 the voltage variation across the resistor 10 will be transferred through the diode 12 to the control grid of the vacuum tube 16. The negative voltage on the control grid of vacuum tube 16 will stop the conduction of the tube 16 thereby releasing the plate of vacuum tube 16. The plate of vacuum tube 16, along with the grid 32 of the vacuum tube 14, begins to rise in potential when tube 16 is cut off, however, this rise is delayed by the charging of condenser 24. After a period of time during which condenser 24 is charged positively through the resistor 17 to a potential approaching the potential on the condenser 26, the vacuum tube 14 is brought into conduction by the now positive control grid 32. The charging current of condenser 24 is small and the positive voltage on cathode 30 due to the condenser 26 remains essentially unchanged, however, during the period of conduction of vacuum tube 14, the cathode 30 will tend to go more positive. The increased positive voltage on the cathode 30 raises the potential of the condenser 24 as it is still charging so that the potential applied to the control grid 32 of vacuum tube 14 goes more rapidly over the cutoff value to increase the rate of change of current conduction of the vacuum tube 14 in the manner of the bootstrap circuit. The limiting condition which prevents the further rise of current in the vacuum tube 14 occurs when the control grid 32, which is directly coupled to the control grid 25 of vacuum tube 18, reaches a potential level at which the control grid 25 of vacuum tube 18 will draw grid current. The diode action between the cathode 27, and the grid 25 of vacuum tube 18 thus limits the positive voltage level which the control grid 32 may reach. The rapid rise of current in tube 14 causes the voltage at the plate 34 of tube 14 to drop thereby causing the voltage of the grid of tube 16 to be lowered, thus maintaining tube 16 cut off. It is to be noted that during the conduction period of vacuum tube 14, condensers 26 and 24 will both become charged. The time which the vacuum tube 14 will conduct is controlled by the timing circuit consisting of condenser 22 and resistor 36. The time constant of capacitor 22 and resistor 36 in combination determines the time which it will take for the grid of vacuum tube 16 to return to such a positive value of potential by charging capacitor 22 through resistance 36 as to again render tube 16 conducting. The delay interval plus the width of the pulse in tube 14 must be longer than the duration of the vertical synchronizing pulse 1. During its period of conduction the vacuum tube 14 forms a positive pulse 40 at its cathode 30. The pulse 40 is coupled through the capacitor 26 and the tube 39 to beam cathode 64. The vacuum tube 14, also during its period of conduction, maintains tube 16 in a cut-off state. Consider the action of the vacuum tube 18 during the period of conduction of the vacuum tube 14. When the vacuum tube 14 begins conducting the vacuum tube 18 will also begin to conduct because the control grids of the two tubes are directly connected. The rapid increase of current in the vacuum tube 14 will be accompanied by a rapid rise of current in the vacuum tube 18. The rapid rise of current in the vacuum tube 18 will rapidly discharge the output capacitor 20 until the vacuum tube 18 is cut off by the return of tube 16 to the conducting state. When the vacuum tube 18 is cut off, the output capacitor 20 will begin to charge exponentially through a plate resistor 21, and a sawtooth pulse 42 will be formed at the plate of the vacuum tube 18. If it were not desired to form a sawtooth deflection pulse 42, a diode vacuum tube could be substituted for the vacuum tube 18. The diode vacuum tube so substituted would satisfactorily perform the function of the vacuum tube 18 with regard to the other circuitry of the vertical deflection generator 50. The sawtooth pulse 42 is utilized to deflect the cathode ray beam formed within the image pickup tube 65 along a vertical path. Due to the delay action of the vertical deflection generator, the sawtooth pulse 42 will cause the cathode ray beam in image pickup tube 65 to increase the length of its scanning fields or frames. The increased movement of the cathode ray beam in the image pickup tube 65 will cause the cathode ray beam to neutralize the charge upon the target anode 68 which is located in areas which are charged by receiving light excitation but which are not used in the makeup of the transmitted video signal. When the cathode ray beam in the image pickup tube 65 impinges up the charged but unused areas, it reduces the potential level in such areas to the potential level of the beam cathode 64. When the potential level on the charged but unused areas is reduced there can be no leakage currents set up between these areas and the areas of the target anode 68 which are utilized for forming the video signal.

The cathode ray beam in image pickup tube 65 is normally blanked out upon reaching the end of a signal forming scanning line or field until the beam is returned to begin another scanning line or field. If the beam is to neutralize areas of the target anode 68 beyond the signal forming field it is necessary that the beam not be blanked out during its deflection into such areas. To maintain the cathode ray beam unblanked after it completes a signal forming scanning field, it is necessary to delay the blanking pulse. A satisfactory delayed blanking pulse is pulse 40 which is generated by the vertical deflection generator 50 at the cathode 30. Therefore, pulse 40 is used to blank the cathode ray beam of image pickup tube 65 during field retrace periods. The blanking operation is performed by driving the beam cathode 64 positive to such a degree that insufficient electrons are emitted to form the cathode ray beam in image pickup tube 65. The horizontal or line blanking of the cathode ray beam in image pickup tube 65 is performed by pulses from the horizontal blanking generator 90 which are not delayed in time.

A portion of the video output signal appearing at the video signal terminal 69 represents the signal generated while neutralizing the area beyond the scanning field and is therefore unwanted. This unwanted portion of the video signal is removed by the blanking pulses 111 which are combined with the video signal in video amplifier 120. The horizontal blanking pulses which with vertical blanking pulses make up the composite blanking signal 111 are not time delayed as are the horizontal blanking pulses 40 which are used to blank the cathode ray beam in image pickup tube 65. The undelayed blanking pulses in the composite blanking signal 111 remove the unwanted portion of the video signal which represents the neutralizing period of the cathode ray beam in image pickup tube 65.

Referring now to Figure 2 in which similar function performing parts are numbered similarly to Figure 1. Figure 2 represents another form of the vertical deflection generator 50. The operation of the vertical deflection generator as shown in Figure 2 is similar to the vertical deflection generator as shown in Figure 1 with the exception that the potential of the cathode 30 of tube 14 is maintained above an undesirable level by the action of a diode 7, which is directly connected between the cathode 30 and a source of fixed potential. The operations of the various tubes and circuitry in Figure 2 is similar to the tubes and circuitry in the vertical deflection generator 50 of Figure 1. The normally conducting vacuum tube 16 is cutoff by the negative vertical synchronizing pulse 1, and the cutting off of tube 16 renders tube 14 conducting after a time delay which depends upon the charging time of capacitor 24 through resistor 17. The magnitude of the current in tube 14 is governed by the level at which the vacuum tube 18 draws grid current and thereby maintains the control grid 32 of tube 14 at a set level. In the circuit shown in Figure 2 there is no pulse generated at the cathode 30 of tube 14 as shown by pulse 40 in Figure 1. In the use of the circuit of Figure 2 as a vertical deflection generator 50, other provisions must be made in the circuit to supply the delayed pulse to blank the cathode ray beam in image pickup tube 65.

The invention claimed is:

1. A pulse generator for generating a delayed pulse comprising a first normally conducting and second normally non-conducting signal amplifying device each having at least an output electrode, a current control electrode, and a further electrode, means for developing a first control bias responsive to the current conducting condition of said first device, means including a first connection from the output electrode of said first device to the control electrode of said second device for applying said first control bias to said second device, a storage capacitor connected between the control and further electrodes of said second device, means for applying a synchronizing pulse to the control electrode of said first device to render said first device non-conducting, means providing a charging circuit for said storage capacitor for charging said storage capacitor when said first device is non-conductive, the charge on said storage capacitor and said first control bias providing a bias for said second device in a direction to render said second device conductive, the conductive condition of said second device being delayed by the charging of said storage capacitor, means for developing a second control bias responsive to the current conducting condition of said second device, a timing circuit connected between the output electrode of said second device and the control electrode of said first device to apply said second control bias to said first device to maintain said first device non-conductive, and means for discharging said storage capacitor to render said first device conducting and said second device non-conducting.

2. A stabilized pulse generator comprising, a first electron discharge device having current control means, means for developing a control bias responsive to the current in said first electron discharge device, a second electron discharge device having cathode, grid and plate electrodes, a timing circuit coupling the current control means of said first electron discharge device to the plate of said second electron discharge device, a coupling circuit applying said control bias to the grid of said second electron discharge device, a resistive plate impedance connected to the plate of said second electron discharge device, means to apply energizing potential to said plate impedance, a cathode impedance connected between the cathode of said second device and a point of reference potential, a voltage control device connected to the cathode of said second electron discharge device to maintain the cathode of said second electron discharge device above a predetermined voltage level, a charging capacitor connected between the grid and the cathode of said second electron discharge device, and a third electron discharge device having at least a cathode electrode and one other electrode, the cathode of said third electron discharge device being connected to a point of substantially unvarying potential, the other electrode of said third electron discharge device being connected to the grid of said second electron discharge device.

3. A stabilized pulse generator comprising; a first electron discharge device having current control means, means for developing a control bias responsive to the current in said first electron discharge device, a second electron discharge device having cathode, grid, and plate electrodes, a timing circuit coupling the current control means of said first electron discharge device to the plate of said second electron discharge device, a coupling circuit for applying said control bias to the grid of said second electron discharge device, a resistive plate impedance connected to the plate of said second electron discharge device, means to apply energizing potential to said plate impedance, a cathode impedance connected between the cathode of said second device and a point of reference potential, a voltage control device connected to the cathode of said second electron discharge device to maintain the cathode of said second electron discharge device above a predetermined voltage level, a charging capacitor connected between the grid and the cathode of said second electron discharge device, a third electron discharge device having cathode, grid and plate electrodes, the cathode of said third electron discharge device being connected to a point of substantially unvarying potential, the grid of said third electron discharge device being connected to the grid of said second electron discharge device, and an output circuit connected to the plate of said third electron discharge device.

4. A device as defined in claim 2 wherein said output circuit comprises a load resistor connected to the plate of said third electron discharge device, means to apply energizing potential to said load resistor, and an output capacitor connected between the plate of said third electron discharge device and said point of reference potential.

5. A device as defined in claim 2 and wherein said voltage control device comprises a regulating capacitor, said regulating capacitor being connected to a point of substantially unvarying potential.

6. A device as defined in claim 2 and wherein said voltage control device comprises a unilateral conducting device said unilateral conducting device being connected to a point of substantially unvarying potential.

7. A device as defined in claim 2 and wherein said timing circuit comprises a resistance-capacitance circuit connected to a point of potential.

8. A scanning control system comprising, a sawtooth generator comprising a first electron discharge device having current control means, means for developing a control bias responsive to the current in said first electron discharge device, a second electron discharge device having cathode, grid and plate electrodes, a timing capacitor coupling the current control means of said first electron discharge device to the plate of said second electron discharge device, a coupling circuit for applying said control bias to the grid of said second electron discharge device, a resistive plate impedance connected to the plate of said second electron discharge device, means to apply energizing potential to said plate impedance, a cathode impedance connected between the cathode of said second device and a point of reference potential, a voltage control device connected to the cathode of said second electron discharge device to maintain the cathode of said second electron discharge device above a predetermined voltage level, a charging capacitor connected between the grid and the cathode of said second electron discharge device, a third electron discharge device having cathode, grid and plate electrodes, the cathode of said third electron discharge device being connected to a point of substantially unvarying potential, the grid of said third electron device being connected to the grid of said second electron discharge device, a plate output circuit connected to the plate of said third electron discharge device, said plate output circuit comprising a load resistor connected to the plate of said third electron discharge device, means to apply energizing potential to said load resistor and an output capacitor connected between the plate of said third electron discharge device and said point of reference potential, a cathode output circuit connected to the cathode of said second electron discharge device, a television image pickup tube for generating a video signal, said image pickup tube having a beam cathode for generating a cathode ray beam, a horizontal and a vertical deflection means for deflecting said cathode ray beam, a target electrode for producing a charge image, and means connecting said cathode output circuit to said beam cathode, means connecting said plate output circuit to said vertical deflection means, a horizontal deflection generator connected to said horizontal deflector means, and a horizontal blanking generator connected to said beam cathode of said image pickup tube system.

9. A generating circuit for producing a saw-tooth wave in response to and delayed in time with respect to an applied train of synchronizing pulses, including a pulse input terminal, a first, second, and third electron discharge device each having cathode, control and anode electrodes, resistors individual to the anode electrodes of said devices for applying fixed energizing potential thereto, a resistive element connected between the cathode electrode of said second device and said point of reference potential, a capacitor connected between the anode electrode of said second device and the other input terminal, a connection between said other input terminal and the control electrode of said first device, a connection between the cathode electrode of said first device and said point of reference potential, a resistor connected between the control electrode of said first device and the cathode electrode of said third device, means maintaining the cathode electrode of said third device at a potential intermediate said energizing and said reference potentials, connections between the control electrodes of said second and said third devices and the anode electrode of said first device, a capacitor connected between the control and cathode electrodes of said second device, a capacitor connected between the anode electrode of said third device and said point of reference potential, and output terminals connected to the electrodes of the last said capacitor.

10. A generating circuit for producing a saw-tooth wave in response to and delayed in time with respect to an applied train of synchronizing pulses, including a pulse input terminal, a first, a second and a third electron discharge device each having cathode, control and anode electrodes, resistors individual to the anode electrodes of said devices for applying fixed energizing potential thereto, a resistive element connected between the cathode electrode of said second device and said point of reference potential, a capacitor connected between the anode electrode of said second device and said input terminal, a connection between said input terminal and the control electrode of said first device, a connection between the cathode electrode of said first device and said point of reference potential, a resistor connected between the control electrode of said first device and the cathode electrode of said third device, means maintaining the cathode electrode of said third device at a potential intermediate said energizing and said reference potentials, connections between the control electrodes of said second and said third devices and the anode electrode of said first device, a capacitor connected between the control and cathode electrodes of said second device, a diode element having a cathode connected to the cathode electrode of said second device an an anode connected to a point of positive potential, a capacitor connected between the anode electrode of said third device and said point of reference potential, and output terminals connected to the electrodes of the last said capacitor.

11. A generating circuit for producing a saw-tooth wave in response to and delayed in time with respect to an applied train of synchronizing pulses, including an input terminal, a first, a second, and a third electron discharge device each having cathode, control and anode electrodes, resistors individual to the anode electrode of said devices for applying fixed energizing potential thereto, a resistive element connected between the cathode electrode of said second device and said point of reference potential, a capacitor connected between the anode electrode of said second device and the other input terminal, a connection between said input terminal and the control electrode of said first device, a connection between the cathode electrode of said first device and said point of reference potential, a resistor connected between the control electrode of said first device and the cathode electrode of the third device, means maintaining the cathode electrode of the third device at a potential intermediate said energizing and said reference potentials, connections between the control electrodes of said second and said third devices and the anode electrode of said first device, a capacitor connected between the control and cathode electrodes of said second device, a capacitor and a resistor connected in series between the cathode electrode of said second device an a point of reference potential, a capacitor connected between the anode electrode of said third device and said point of reference potential, and output terminals connected to the electrodes of the last said capacitor.

12. A pulse generator comprising in combination, a first normally conducting signal amplifying device having a control electrode, an output electrode, and a further electrode, a second normally non-conducting signal amplifying device having a control electrode, an output electrode, and a further electrode, a charge storage element connected between the control and further electrodes of said second device, first direct-current conductive means connecting the control electrode of said second device with the output electrode of said first device, means including a timing circuit coupling the output electrode of said second device with the input electrode of said first device, a third normally non-conducting signal amplifying device including at least an input electrode and an output electrode, second direct-current conductive means coupling the output electrode of said first device with the input electrode of said third device, a discharge circuit connected with the output electrode of said third device, means for applying a synchronizing pulse to the control electrode of said first device, said pulse being of predetermined width and of a polarity to render said first device non-conducting, means providing a charging circuit for said storage element for charging said storage element when said first device is non-conductive, the charge on said storage element and the non-conducting condition of said first device providing a bias for said second device in a direction to render said second device conductive and maintain said first device non-conducting, the conductive condition of said second device being delayed by the charging of said storage element, said third device being rendered conductive through said first and second direct-current conductive connections in response to the conduction of said second device to discharge said discharge circuit and render said third device non-conductive, means for deriving a first voltage pulse delayed with respect to said synchronizing pulse from the output electrode of said third device in response to the non-conductive condition of said third device and the charging of said discharge circuit, and means for deriving a second voltage pulse delayed with respect to said synchronizing pulse from the further electrode of said second device.

13. In a television pickup system, the combination with an image pickup tube including cathode ray deflecting means and a cathode, of a scanning control circuit for said pickup tube comprising in combination, a first normally conducting signal amplifying device having a control electrode, an output electrode, and a further electrode, a second normally non-conducting signal amplifying device having a control electrode, an output electrode, and a further electrode, a charge storage element connected between the control electrode and further electrode of said second device, first coupling means connecting the control electrode of said second device with the output electrode of said first device, means coupling the output electrode of said second device with the input electrode of said first device, a third normally non-conducting signal amplifying device including at least an input electrode and an output electrode, second coupling means connecting the output electrode of said first device with the input electrode of said third device, a discharge circuit connected with the output electrode of said third device, means for applying a vertical synchronizing pulse to the control electrode of said first device, said pulse being of predetermined width and of a polarity to render said first device non-conducting means providing a charging circuit for said storage element for charging said storage element when said first device is non-conductive, the charge on said storage element and the non-conducting condition of said first device providing a bias for said second device in a direction to render said second device conductive and maintain said first device non-conducting, the conductive condition of said second device being delayed by the charging of said storage element, said third device being rendered conductive through said first and second coupling means in response to the conduction of said second device to discharge said discharge circuit and render said third device non-conductive, means for deriving a sawtooth pulse delayed with respect to said synchronizing pulse from the output electrode of said third device in response to the non-conductive condition of said third device and the charging of said discharge circuit, means for applying said sawtooth pulse to said deflecting means, means for deriving an output voltage pulse delayed with respect to said synchronizing pulse from said second device, and means for applying said output voltage pulse to the cathode of said pickup tube.

14. In a television pickup system, the combination with an image pickup tube including cathode ray deflecting means and a cathode, of a scanning control circuit for said pickup tube comprising in combination, a first normally conducting signal amplifying device having a control electrode, an output electrode, and a further electrode, a second normally non-conducting signal amplifying device having a control electrode, an output electrode, and a further electrode, a charge storage element connected between the control electrode and further electrode of said second device, first direct-current conductive means connecting the control electrode of said second device with the output electrode of said first device, means including a timing circuit coupling the output electrode of said second device with the input electrode of said first device, a third normally non-conducting signal amplifying device including at least an input electrode and an output electrode, second direct-current conductive means coupling the output electrode of said first device with the input electrode of said third device, a discharge circuit connected with the output electrode of said third device, means for applying a vertical synchronizing pulse to the control electrode of said first device, said pulse being of predetermined width and of a polarity to render said first device non-conducting, means providing a charging circuit for said storage element for charging said storage element when said first device is non-conductive, the charge on said storage element and the non-conducting condition of said first device providing a bias for said second device in a direction to render said second device conductive and maintain said first device non-conducting, the conductive condition of said second device being delayed by the charging of said storage element, said third device being rendered conductive through said first and second direct-current conductive connections in response to the conduction of said second device to discharge said discharge circuit and render said third device non-conductive, means for deriving a sawtooth pulse delayed with respect to said synchronizing pulse from the output electrode of said third device in response to the non-conductive condition of said third device and the charging of said discharge circuit, means for applying said sawtooth pulse to said deflecting means, means for deriving an output voltage pulse delayed with respect to said synchronizing pulse from the further electrode of said second device, and means for applying said output voltage pulse to the cathode of said pickup tube.

References Cited in the file of this patent

UNITED STATES PATENTS

| | | |
|---|---|---|
| 2,092,875 | Campbell | Sept. 14, 1937 |
| 2,207,048 | Campbell | July 9, 1940 |
| 2,366,076 | Wilbur | Dec. 26, 1944 |
| 2,536,808 | Higinbotham | Jan. 2, 1951 |
| 2,678,347 | Clothier | May 11, 1954 |